Patented Jan. 13, 1931

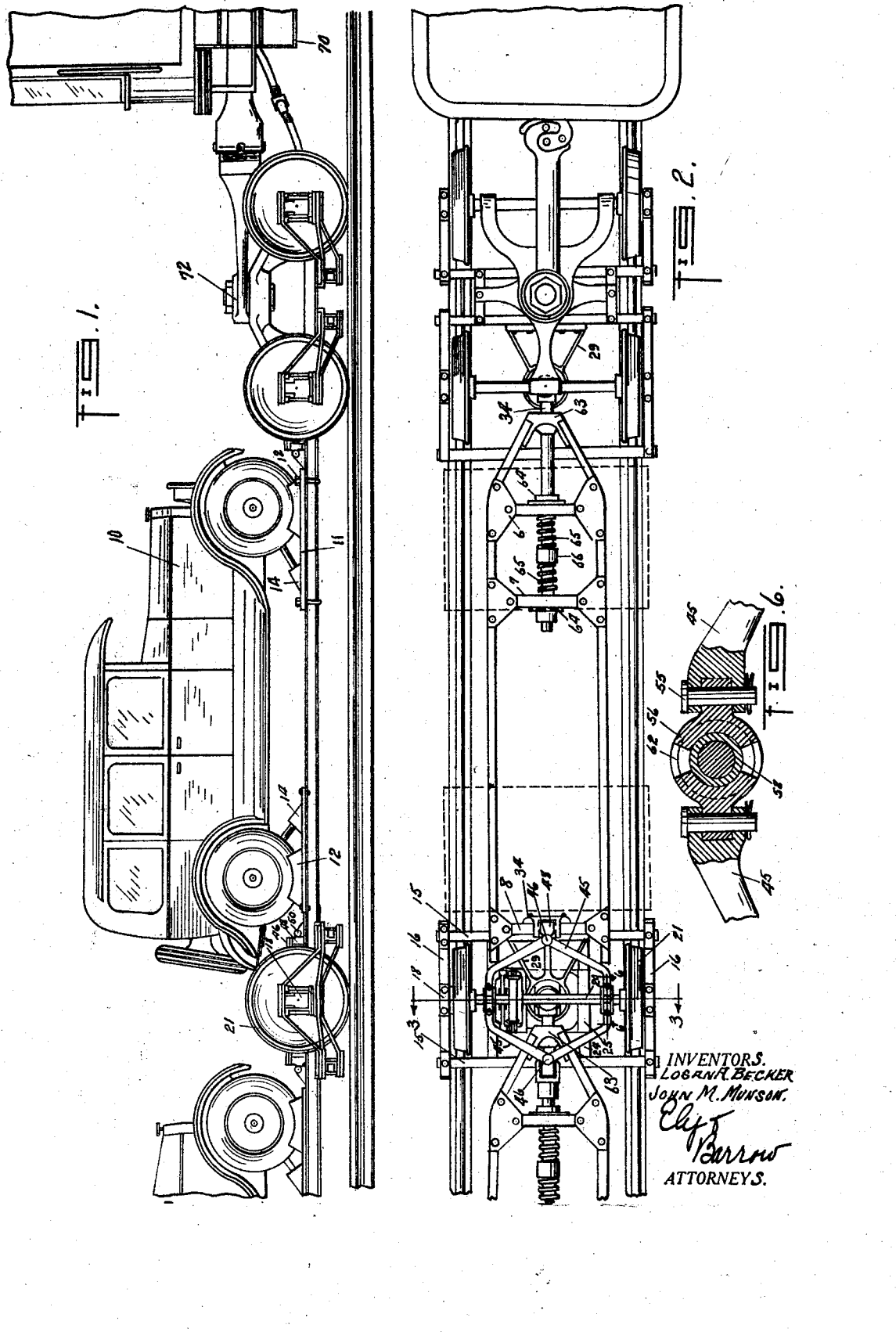

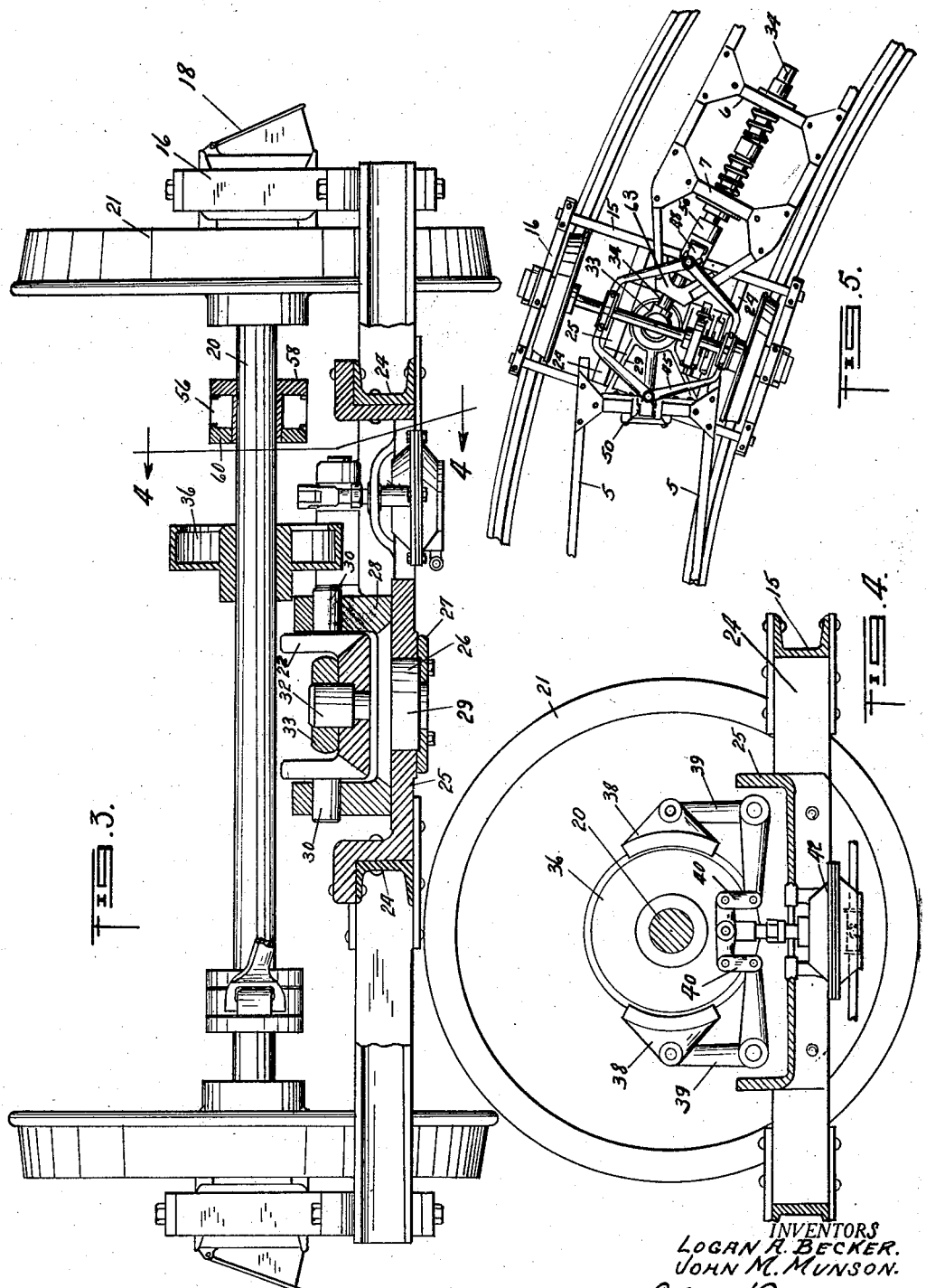

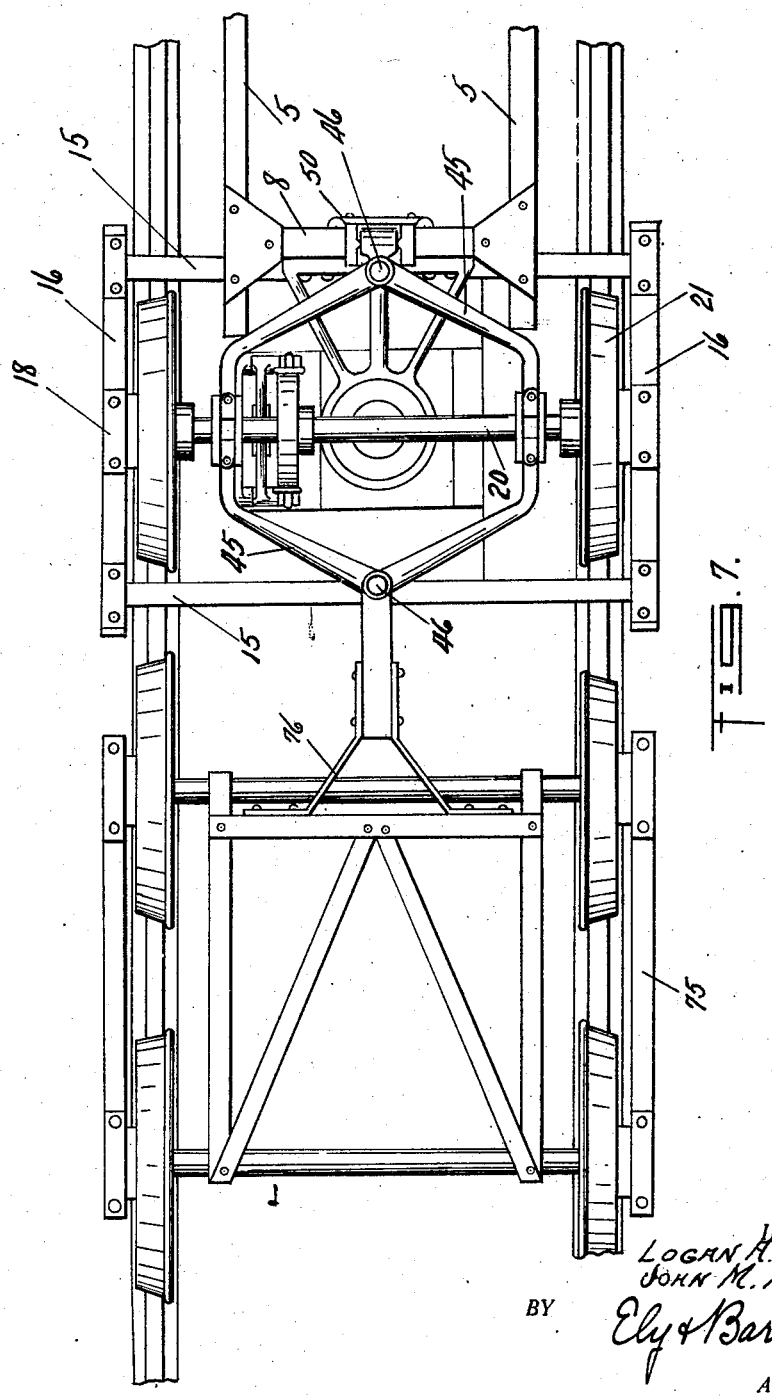

1,788,853

UNITED STATES PATENT OFFICE

LOGAN A. BECKER AND JOHN M. MUNSON, OF LAKEWOOD, OHIO, ASSIGNORS TO THOMAS F. DOLAN, OF SHAKER HEIGHTS, OHIO

MOTOR-CAR-TRANSPORT TRAIN

Application filed March 24, 1928. Serial No. 264,556.

The present invention has for its object the provision of means for transportation of motor vehicles, by which automobiles may be transported by railway cheaper and more efficiently than is possible with present equipment.

The advantages of the invention reside in economy in transportation, dispensing with expensive drive-away methods now in use in transporting new automobiles from the factory to the dealer. The cars are delivered in unused condition to the automobile dealer, the employment of large crews of drivers is eliminated and other advantages and benefits are derived from the method of transportation described herein.

The mechanism shown and described herein has many advantages over freight car methods of transportation, in that the apparatus is particularly designed for the transportation of automobiles and it is, therefore, economical and efficient. The apparatus comprises a plurality of articulated units, each of which is designed for the mounting of a single automobile, the units being coupled together so that they may be easily uncoupled and stacked for reshipment to the factory.

The invention will be described with particular reference to the embodiment shown in the accompanying drawings, but it will be appreciated that modifications and improvements may be made therein without departure from the essential features of the invention or from the principles and scope thereof, as set forth in the claims.

In the drawings,

Figure 1 is a side elevation of a portion of a train showing the apparatus as adapted for electric interurban transportation;

Figure 2 is a plan view with the automobiles dismounted therefrom;

Figure 3 is an enlarged cross-section on the line 3—3 of Figure 2;

Figure 4 is a section on the line 4—4 of Figure 3;

Figure 5 is a detail of the train rounding a curve and moving in the opposite direction from the main figure;

Figure 6 is a section through a radius rod connection on the line 6—6 of Figure 2; and Figure 7 is a plan view of the end of the last car of the train with a dummy truck attached thereto.

The train comprises a series of units, each of which consists of two parallel rails or side bars 5 which, together with two parallel cross rails 6 and 7 at the forward end of the unit and a single cross rail 8 at the rear of the unit, constitute the rigid unit for the automobile 10. To the upper surfaces of the rails 5 are secured platforms 11 to which are fastened chock blocks 12 for the wheels of the automobile and clamping members 14 to be attached to the platforms 11 and to a convenient portion of the automobile to hold it upon the platform. One or both of the platforms are designed to be adjustable along the side bars to accommodate automobiles of varying wheel bases.

Each unit includes as a permanent element, a truck consisting of parallel, transverse members 15 connected by side bars 16 which form a rigid rectangular framework. The bars 16 have journals 18 secured thereto, in which the axle 20 for the wheels 21 is mounted. Connecting the transverse members 15 are spaced parallel rails 24 to which is secured a platform 25 in which is located, at the center of the framework, a trunnion 26. The trunnion is formed on the under side of a bracket 29 secured to transverse rail 8 and is free to rotate in the platform, being secured in its bearing by a plate 27 fastened to the under side of the trunnion. The bracket 29 is also provided with uprights 28 which are parallel to the direction of movement of the train and which support a swinging cradle 22 upon pins 30 passing through the arms 28. In the cradle is secured the king pin 32 which is located over the center of the truck and over which is fitted a head 33 carried on the end of the draw bar 34 of the next adjacent unit, whereby the forward end of the said unit is supported and carried by the truck of the preceding unit.

Each axle carries a brake drum 36 located at one side of the king pin connection, the drum being engaged by two shoes 38, mounted on the ends of bell crank levers 39 which are actuated by linkage 40 from a diaphragm 42 suspended from the platform 25. The brakes are of any usual or preferred type and are operated from a pressure line from the power unit. The design and construction of the brake is not important, it being essential merely that each of the units be provided with braking mechanism.

In order to cause the trucks to pivot about the trunnion 26 and thereby direct the units about curves, the construction provides radius rods 45. The rods 45 are arranged in pairs, pivoted on vertical bolts 46, mounted on knuckles 48 pivoted to rock upon horizontal axes in clevises 50.

The pair of radius rods extending toward the unit of which the truck is a member, is secured by means of the clevis 50 to the transverse cross bar 8 of the unit. The rearwardly extending radius rods are attached to the draw bar 34 of the following unit by keying the clevis 50 to the draw bar so that it will slide thereon, but is prevented from rotating with respect to the draw bar.

The end of each radius rod remote from the pivot 46 is forked as shown in Figure 6, pin 55 passing through the fork and through a shoe 56. This shoe is flanged inwardly, and with a like shoe from the adjacent radius rod partially surrounds a sleeve 58 which is slidable along the axle 20. The shoes are confined by a collar 60 and by overhanging flanges 62 on the sleeve and the collar which engage the flanges on the shoes. The shoes only partially surround the sleeve so as to permit relative angular movement of the pairs of radius rods induced by elevation or depression of a unit entering an up or down grade.

The forward ends of the rails 5 are curved, as shown, and at the apex of each unit is located a sleeve 63 through which the draw bar 34 is movable. The rear end of the draw bar slides in bearings 64 attached to the cross members 6 and 7 and the draw bar exerts pull through heavy coil springs 65 bearing against a collar 66 attached to the draw bar midway between the members 6 and 7. Units may be disconnected by withdrawing the pin 46, which is located over the draw bar, and by lifting the draw bar off the king pin 32.

In the embodiment of the invention as shown herein, the train of articulated units is propelled by attachment to an electric car 70 and for this purpose it may be advisable to provide a dummy truck 72 which is coupled to the car 70 in any prefered manner. The details of the dummy truck may be varied, it being necessary merely that the dummy truck be provided with a king pin for the reception of the draw bar from the first unit. It is also possible to connect the draw bar of the first unit directly to the car 70, without the provision of a dummy truck.

In order to guide the last unit of the train it is necessary to provide a trailer 75, which has a bracket 76 thereon, in which the pivot pin 46 may be received, this pin connecting the rear radius rods with the trailer. This attachment to the train serves to guide the framework or truck on the last unit of the train. If desired the trailer may be a flat car on which the units are stacked for return shipment to the original point of shipment.

The operation of the train will be apparent from the description which has been given. Each unit which comprises a framework and a truck is connected to the following unit by connection of the draw bar and the king pin and by insertion of the pin 46. In rounding a curve, the radius rods gradually turn the trucks so that the curve is negotiated without accident. The construction is such that the radius rods become effective just prior to the time when each truck reaches the curve so that the turning movement is initiated before the curve is reached and the reverse action is true at the end of the curve.

In entering an up or down grade, the angular movement of the units is taken care of by the movement of the shoes at the end of the radius rods and by rocking of the cradle 22 upon its pivots 30. Twisting of the several units is taken care of by the rotation of each unit about the draw bar. A very flexible train is thus provided and all of the exigencies of operation over the usual roadbed are provided for.

When the consignment of automobiles is delivered the several units are disconnected and stacked upon a flat car which, as described above, may be carried at the end of the train. They can then be economically returned to the point of origin.

It will be understood that while the invention is particularly intended and adapted for the transportation of automobiles, it may be used in the transportation of other commodities, the advantages and benefits of the construction being adaptable for many purposes.

What is claimed is:

1. An articulated train for the uses and purposes set forth comprising a plurality of individual units, each unit embodying a framework, a truck pivotally mounted at one end of the framework, means to couple the units together in a train, with the framework of one unit supported by the truck of the next adjacent unit, and means carried by one unit to cause the pivotal movement of the truck of the next adjacent unit.

2. An articulated train for the uses and purposes set forth comprising a plurality of individual units, each unit embodying a framework, a truck pivotally mounted at one end of the framework, means to couple the units together in a train, with the framework of one unit supported by the truck of the next adjacent unit, and radius rods connected to the end of each unit and to the truck of the next adjacent unit to induce pivotal movement of the truck.

3. An articulated train comprising a plurality of individual units, each unit consisting of a framework, a trunnion secured to one end of the framework, a truck pivoted on the trunnion, a king pin carried by the trunnion, a draw bar on the opposite end of the unit, the draw bar on each unit being receivable over the king pin of the next adjacent unit, and means actuated by the adjacent unit to induce rotation of the truck upon its trunnion.

4. An articulated train comprising a plurality of individual units, each unit consisting of a framework, a trunnion secured to one end of the framework, a truck pivoted on the trunnion, a king pin carried by the trunnion, a draw bar on the opposite end of the unit, the draw bar on each unit being receivable over the king pin of the next adjacent unit, and means actuated by the adjacent unit to induce rotation of the truck upon its trunnion, said means comprising radius rods connected to the adjacent unit.

5. An articulated train comprising a plurality of individual units, each unit consisting of a frame work, a trunnion secured to one end of the framework, a truck pivoted on the trunnion, a king pin carried by the trunnion, a draw bar on the opposite end of the unit, the draw bar on each unit being receivable over the king pin of the next adjacent unit, and means actuated by the adjacent unit to induce rotation of the truck upon its trunnion, said means comprising pairs of radius rods, one pair being connected to the said unit and the other pair to the adjacent unit.

6. A unit of an articulated train comprising a framework, a pivoted truck at one end of the frame work, and a draw bar on the opposite end of the framework, the said unit being adapted to be connected to a similar unit to compose an articulated train, each unit being supported at one end by its own truck and at the opposite end by the truck of the next unit, and a king pin on each framework adapted to receive the draw bar of the next unit, each truck having radius rods to control the pivotal movement thereof, said radius rods being adapted to be connected to the next unit.

7. A unit of an articulated train comprising a framework, a trunnion at one end of the framework, a truck pivoted on the trunnion, said truck having a transverse wheel axle, pairs of pivotally connected radius rods having sliding and rotary connection with the wheel axle, the pivots of each pair of rods being connected to one unit of an articulated train when the units are coupled.

8. A unit of an articulated train comprising a framework, a trunnion at one end of the framework, a truck pivoted on the trunnion, said truck having a transverse wheel axle, pairs of pivotally connected radius rods having sliding and rotary connection with the wheel axle, and having angular movement with respect to one another, the pivots of one pair of rods being connected to the adjacent unit of an articulated train when the units are coupled.

9. A unit of an articulated train comprising a framework, a trunnion at one end of the framework, a cradle on the framework adapted to rock in a horizontal axis, a king pin on the cradle, and a truck pivotally mounted on the trunnion, and adapted to rock in a vertical axis thereon.

10. A unit of an articulated train comprising a framework, a trunnion at one end of the framework, a cradle on the framework adapted to rock in a horizontal axis, a king pin on the cradle, a truck pivotally mounted on the trunnion, and adapted to rock in a vertical axis thereon and a draw bar at the other end of the framework, said draw bar being receivable of the king pin of the next unit and rotatable in the framework.

11. An articulated train comprising a plurality of units, each unit consisting of a framework and a truck located at one end of the framework and pivoted thereon, the several units being connected together by draw bars mounted in the ends thereof opposite the trucks, the units having pivotal movement with respect to one another in all directions.

12. An articulated train comprising a plurality of units, each unit consisting of a framework and a truck pivoted at one end of the framework, the several units being connected together by draw bars mounted in the ends thereof opposite the trucks, the units having pivotal movement with respect to one another in all directions, and means to induce pivotal movement of the truck from the next adjacent unit.

LOGAN A. BECKER.
J. M. MUNSON.